US008205424B1

(12) United States Patent
Lang et al.

(10) Patent No.: US 8,205,424 B1
(45) Date of Patent: Jun. 26, 2012

(54) BALER PRE-CUTTER ROTOR DESIGN HAVING REINFORCED TINES

(75) Inventors: Eric R. Lang, Ottumwa, IA (US); Walter M. Schlesser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/270,729

(22) Filed: Oct. 11, 2011

(51) Int. Cl.
*A01D 39/00* (2006.01)
*A01D 43/02* (2006.01)
*A01D 75/00* (2006.01)

(52) U.S. Cl. ......................................................... 56/341
(58) Field of Classification Search .................... 56/341, 56/249, 190, 364; 198/677, 676; 100/65, 100/144, 177, 88; 460/112
See application file for complete search history.

(56) References Cited

U.S. PATENT DOCUMENTS

| | | | | |
|---|---|---|---|---|
| 4,351,144 A | * | 9/1982 | Benenati | 56/295 |
| 4,907,503 A | * | 3/1990 | Ryan | 100/65 |
| 6,595,123 B2 | * | 7/2003 | Schrag et al. | 100/97 |
| 6,679,041 B2 | * | 1/2004 | Viaud et al. | 56/341 |
| 6,769,239 B1 | * | 8/2004 | Webb | 56/341 |
| 6,820,735 B1 | * | 11/2004 | Cullen | 198/677 |
| 6,886,312 B1 | * | 5/2005 | Inman et al. | 53/527 |
| 7,124,568 B2 | * | 10/2006 | Hotaling | 56/341 |
| 7,694,504 B1 | * | 4/2010 | Viaud et al. | 56/341 |
| 7,716,910 B2 | * | 5/2010 | Woodford | 56/364 |
| 7,867,072 B2 | * | 1/2011 | Lauwers et al. | 460/112 |

* cited by examiner

*Primary Examiner* — Arpad Fabian-Kovacs

(57) ABSTRACT

Tines of a baler pre-cutter rotor each include a plate having a plurality of points disposed at equally spaced locations about a rotation axis of the rotor, with each point having a leading region reinforced by a pair of straps fixed in sandwiching relationship to the point. In one embodiment, the pair of straps is also applied to opposite sides of a trailing region bordering a circular mounting hole of the plate. In another embodiment, a second pair of straps abuts each first pair of straps and reinforces a leading region bordering the circular mounting hole. Instead of the second pair of straps, a ramp may be provided on a side surface of the plate for deflecting crop towards a pre-cutter stationary cutting knife. Instead of including separate straps, the tines can be cast or forged as identical sections including a tine point.

16 Claims, 5 Drawing Sheets

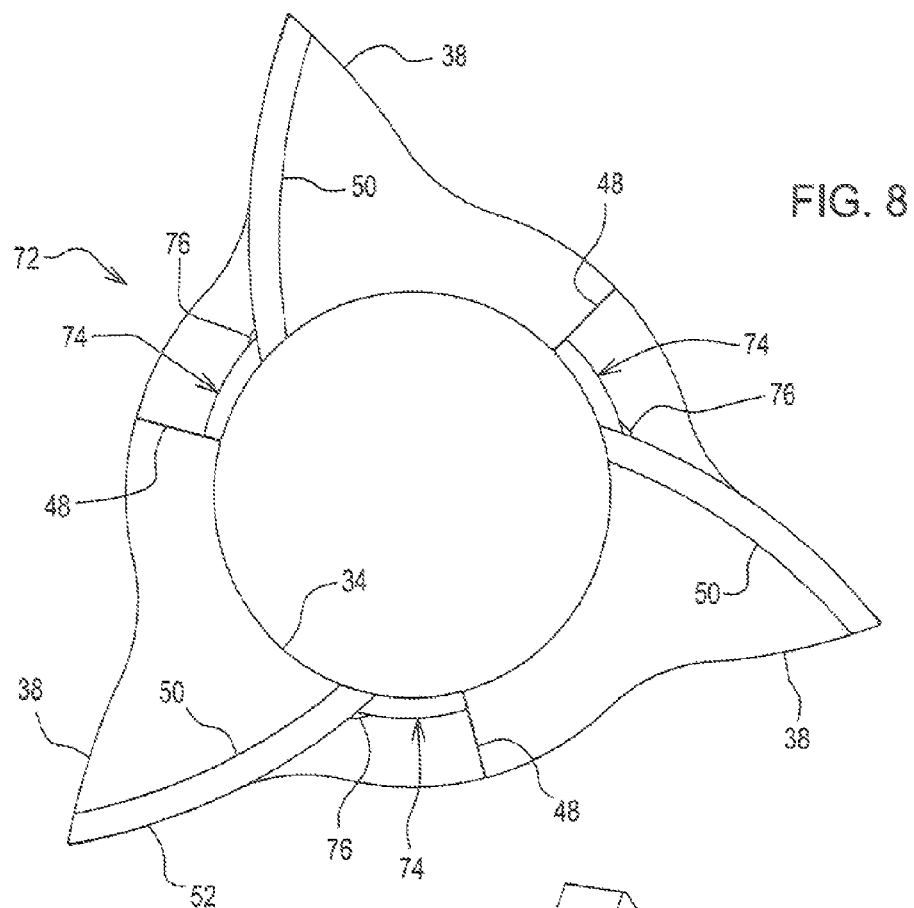
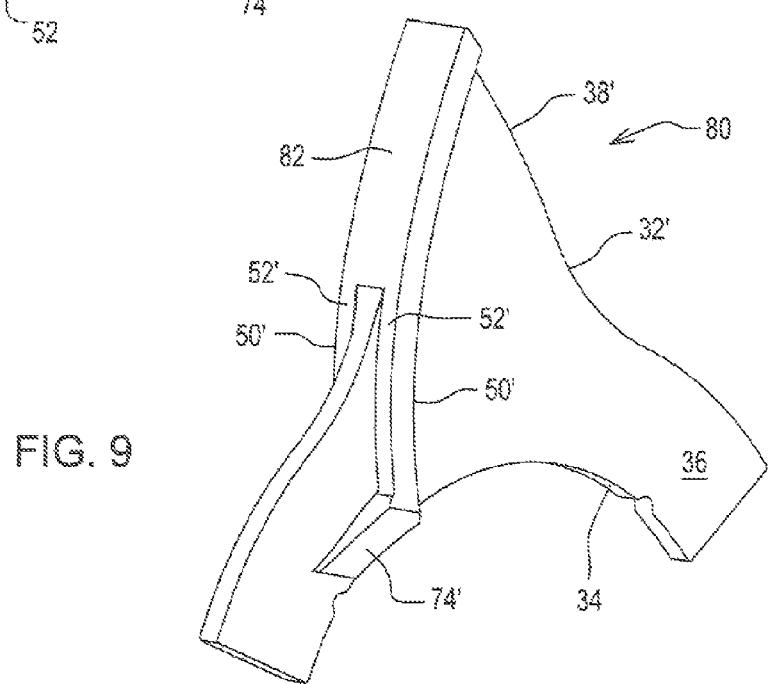

BALER PRE-CUTTER ROTOR DESIGN HAVING REINFORCED TINES

FIELD OF THE INVENTION

The present invention relates to pre-cutter arrangements for agricultural crop gathering machines, and more particularly, relates to tines for the rotors of such pre-cutter arrangements.

BACKGROUND OF THE INVENTION

Current pre-cutter arrangements include rotors having tines constructed of planar metal plates mounted in spaced, parallel relationship along a length of a cylindrical rotor member, the tines each including a plurality of crop-engaging points arranged equal-angularly about a rotation axis of the rotor member. The tines are arranged to sweep parallel paths located on opposite sides of stationary cutter knives and crop strippers. U.S. Pat. Nos. 7,694,504 and 6,595,123 disclose pre-cutter arrangements of this type.

A drawback of these prior art pre-cutter arrangements is that the rotor tines are vulnerable to being bent by rocks that are carried with the windrow of crop fed into the rotors for engagement by the tines, with these bent tines being problematic in that they may come into contact with the stationary counter knives and/or crop strippers, which may result not only in the bent tine suffering further damage, but may result in the knives and strippers being damaged as well.

In attempting to address this problem, manufactures have resorted to constructing the tines from materials offering more bend resistance and/or have constructed the tines so as to have a thicker cross section for resisting bending. Bend resistant materials are costly and are hard to weld. Thicker tines result in fewer knives being present over a given width dimension of the rotor, resulting not only in less reduction of the material which passes through the pre-cutter arrangement, but also results in an increase in the weight of the pre-cutter arrangement, thus requiring additional horsepower to propel the machine carrying the pre-cutter arrangement.

The problem to be solved then is that of providing a pre-cutter rotor having tines which are relatively stiff, but do not add weight to the rotor, and which do not require a reduction in the number of stationary cutter knives that cooperate with the rotor tines over a given width dimension of the pre-cutter arrangement.

SUMMARY OF THE INVENTION

According to the present invention, there is provided an improved pre-cutter rotor, and more particularly, there is provided an improved rotor tine.

A broad object of the invention is to provide a rotor tine which overcomes the above-noted drawbacks associated with prior art rotor tines.

The foregoing object of the invention is accomplished according with a first embodiment by providing a rotor having tines, each comprising a plate having a plurality of points equal-angularly arranged about its periphery, with the plate being stiffened by pairs of straps sandwiching at least the points of tine; in accordance with a second embodiment like that of the first embodiment, but constructing the straps to also include a section reinforcing the region bounding the mounting opening of the tine and to include a second strap reinforcing a remaining portion of the region bounding the opening; in accordance with a third embodiment constructed like the first embodiment but adding a ramp bounding the mounting opening for deflecting crop material axially outward to the cutting surface of the tine; and in accordance with a fourth embodiment wherein a tine having the features of the third embodiment is constructed as a casting.

This and other objects of the invention will become apparent from a reading of the ensuing description together with the appended drawings.

BRIEF DESCRIPTION OF THE DRAWINGS

FIG. 8 is a view like that of FIG. 4, but showing a third embodiment of the invention wherein a ramp is added for deflecting crop to the cutting surface of each of the tine points.

FIG. 9 is a perspective view of a one-third section of the tine shown in FIG. 8, but showing a cast version of the tine section.

DESCRIPTION OF THE PREFERRED EMBODIMENT

Figure 1:
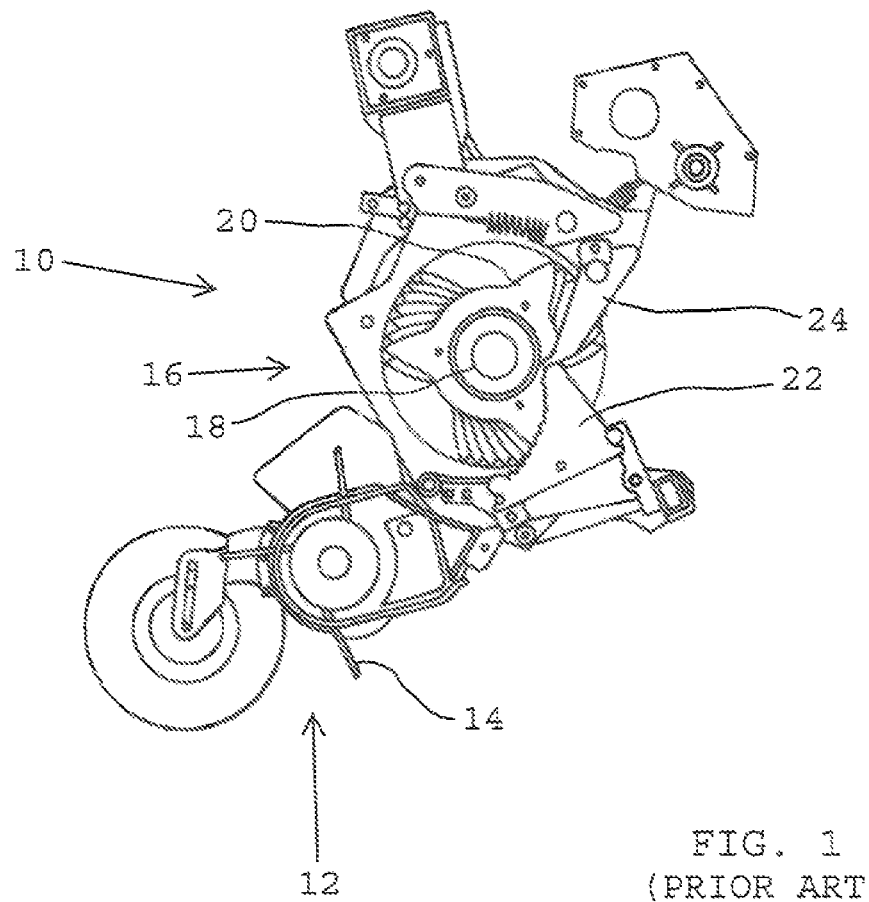
FIG. 1 is a vertical sectional view, looking toward the right, taken through a conventional crop material pickup crosswise to the direction of travel.

Referring now to FIG. 1, there is shown a conventional crop material pickup 10 carried at the front of an agricultural implement, not further shown, such as a baler, for example, for processing gathered crop. The pickup 10 includes a pick-up rotor 12 provided with spring wire tines 14 that engage, and elevate a windrow of crop material (not shown) lying on the ground and convey the crop rearwardly for further processing by a pre-cutter arrangement 16. The pre-cutter arrangement 16 comprises a transverse pre-cutter rotor 18 carrying a plurality of identical, laterally spaced rotor tines 20, disposed in interleaved relationship both to a plurality of transversely spaced, retractable pre-cutter knives 22, and to a plurality of transversely spaced crop stripper members 24.

Figure 2:
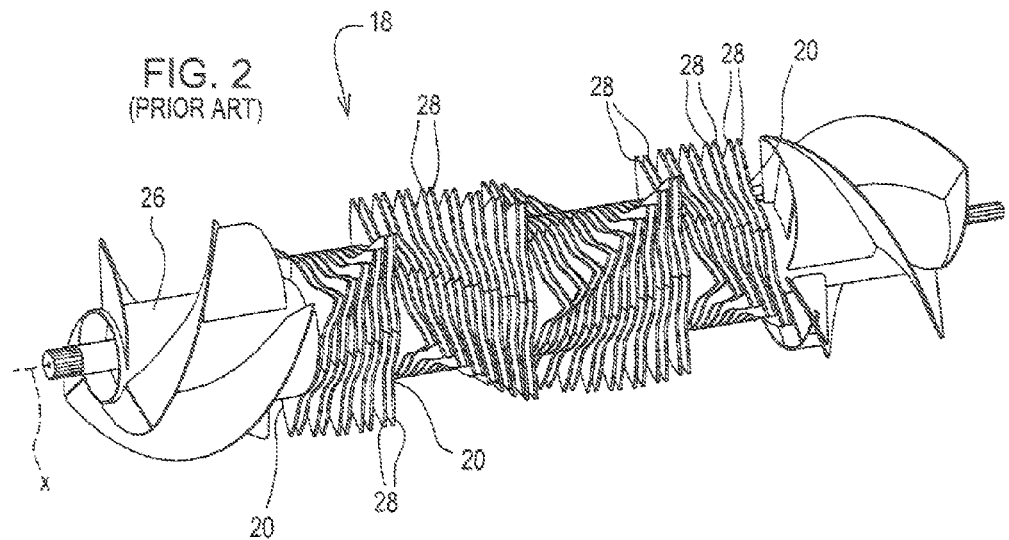
FIG. 2 is a front left perspective view of a conventional pre-cutter rotor.

Referring to FIG. 2, it can be seen that the conventional pre-cutter rotor 18 includes a central cylindrical member 26, in the form of a tube having a central axis X about which the rotor rotates. Each of the rotor tines 20 is in the form of a flat plate provided with a central circular mounting opening in which a central section of the cylindrical member 26 is located. The tines 20 each include three crop-engaging points 28 disposed at equal angularly spaced locations about the axis X, with adjacent pairs of the tines having their respective points located at the same angular position and being angularly indexed relative to the respective points of an adjacent pair of tines 20.

Figure 3:
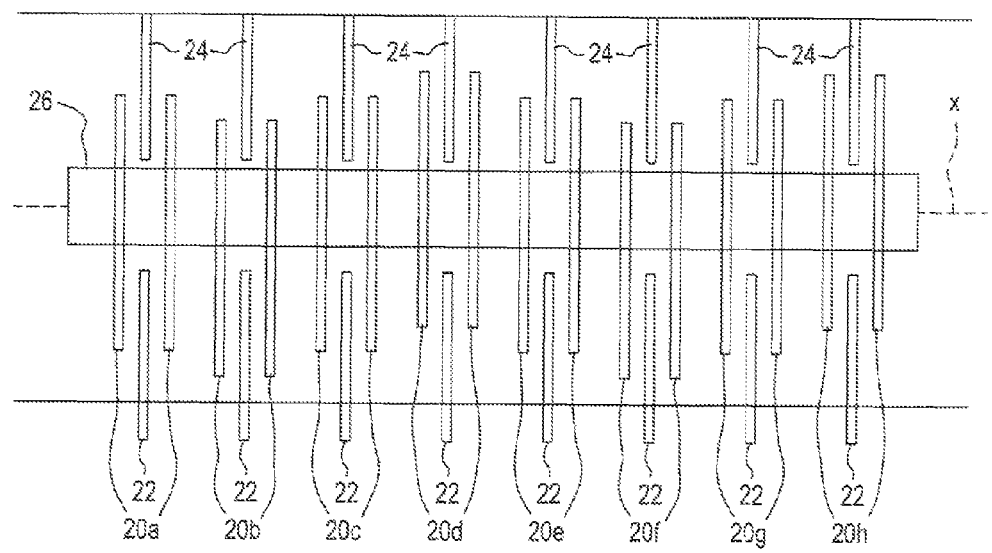
FIG. 3 is a schematic representation of the pre-cutter arrangement illustrated in FIG. 1.

Referring now also to FIG. 3, there is shown a schematic illustration of the tines 20 together with the pre-cutter knives 22, the tines being shown, from left to right, in grouped pairs 20a, 20b, 20c, 20d, 20e, 20f, 20g and 20h, the grouped pairs of tines 20 being disposed in interleaved relationship to, and equal-distant from, the knives 22 and stripper members 24

During operation, the pickup 10 delivers crop material to the conventional pre-cutter rotor 18, which rotates counter-clockwise, as viewed in FIG. 1. The points 28 of the tines 20 engage and move the crop material downwardly against the upwardly and forwardly facing cutting edges of the cutter knives 22 resulting in the crop material being cut into pieces, the tine points then acting to deliver the cut pieces rearwardly for collection or for further processing.

In one known pre-cutter arrangement, each knife 22 and stripper member 24 is 5 mm thick and is centered between a respective one of the adjacent tine pairs 20a-20h, with a clearance of 4 mm being provided between the respective sides of each tine and the adjacent knife and stripper. Thus, it will be appreciated that, if for any reason a point 28 should be deflected sideways toward an adjacent knife 22 or stripper member 24 by more than 4 mm, it will collide with the knife and/or stripper.

Figure 4:
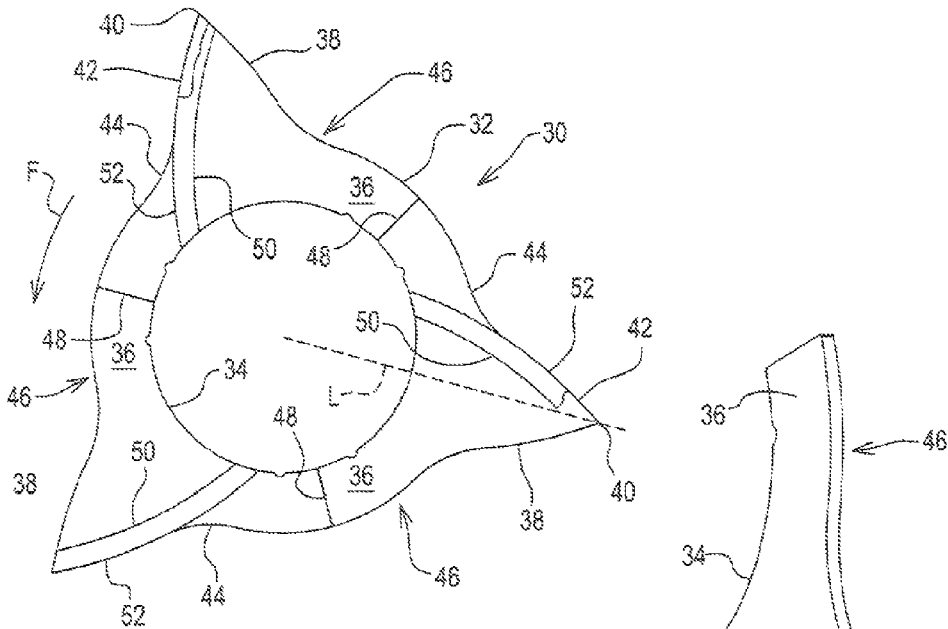
FIG. 4 is a side elevational view of a tine constructed in accordance with the present invention, with portions broken away to reveal hidden structure.
Figure 5:
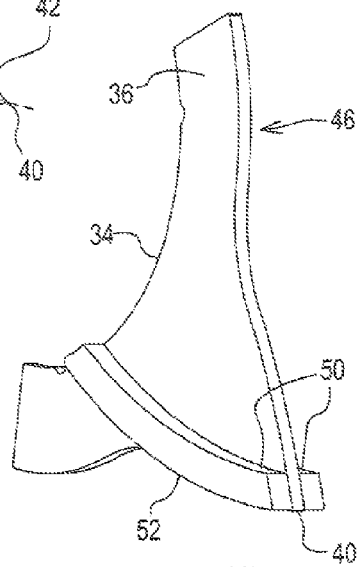
FIG. 5 is a perspective view of a one-third section of the tine shown in FIG. 4 including one of the points of the tine.

Referring to FIGS. 4 and 5, there is shown a tine 30 constructed in accordance with a first embodiment of the present invention. The tine 30 includes a flat plate 32 in the form of a star including a centrally located, circular mounting hole 34 surrounded by a ring-shaped mounting portion 36 to which a plurality of radially extending crop-engaging points 38 are joined at equal-angularly spaced locations about the center of the hole 34. Although they need not be, the points 38 are each formed symmetrically about a radial line L extending between the axis of the hole 34 and a tip 40 of the point. For the sake of discussion, the forward direction of rotation F of the tine 30 is considered to be counterclockwise, as indicated by the arrow in FIG. 4. When considered relative to the forward direction of rotation F, each crop-engaging point 38 of the tine 30 has a leading-edge including an outer convexly curved section 42 which extends inwardly from the tip 40 of the point and is joined to a concavely curved inner section 44 that forms a base of the point and is joined to an outer diameter of the mounting ring 36. While it need not be so constructed, the tine 30 is made in three identical sections 46 that are welded together along radial lines 48. The tines are assembled to a cylindrical rotor member, like the conventional cylindrical member 26.

Provided for adding stiffness to the plate 32, are three pairs of identical stiffening or reinforcing straps 50, with each pair of straps 50 being fixed (welded or secured with flush-mounted fasteners, for example) in sandwiching relationship to a respective tine point 38 in a marginal region including the tip 40 and leading edge 42, with the straps 50 each being curved throughout its length so as to present a leading edge 52 that is identical to the curvature of the convexly curved, outer leading edge section 42 of the points 38, and with the straps 50 being mounted such that their leading edges 52 form lateral extensions of the leading edge section 42 of the points. The pairs of straps 50 each extend inwardly across the mounting ring 36 and terminate at the hole 34, i.e., the inner diameter of the mounting ring 36. Thus, it will be appreciated that the tines 30 are stiffened or reinforced in the region of impact of the points 38 with crop material or with any rocks or obstacles that may be fed into the rotor assembly with the windrow of crop material so as to resist bending.

Figure 6:
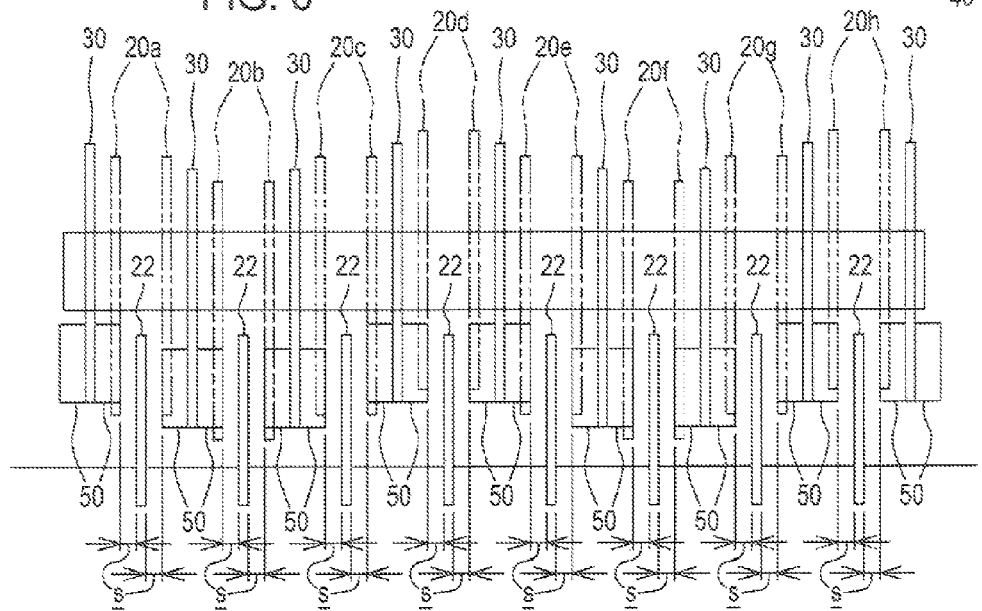
FIG. 6 is a schematic representation of the pre-cutter arrangement like that of FIG. 3, but showing the conventional tines in broken lines and the tines of FIG. 4 in solid lines, and omitting the stripper members.

Referring to FIG. 6, there is schematic showing of a pre-cutter rotor 60 which differs from the schematic of the conventional rotor 18 illustrated in FIG. 3 in that the conventional tine pairs 20a-20h are shown in broken lines while a plurality of the tines 30 of the present invention are shown fixed to axially spaced locations of the cylindrical member 26. It is important to note that the mounting location of each new tine 30 is offset from that of an adjacent conventional tine by a distance which results in the outer sides of the straps 50 being spaced from the adjacent knife 22 by a distance s equal to the spacing of the conventional tines 20 from the adjacent knife. In the example shown, this permits nine new tines 30 to be used to replace sixteen conventional tines 20, which results in a net weight reduction, since the weight of the added 18 straps 50 is far less than the weight of the seven conventional tines 20 which are eliminated.

Figure 7:
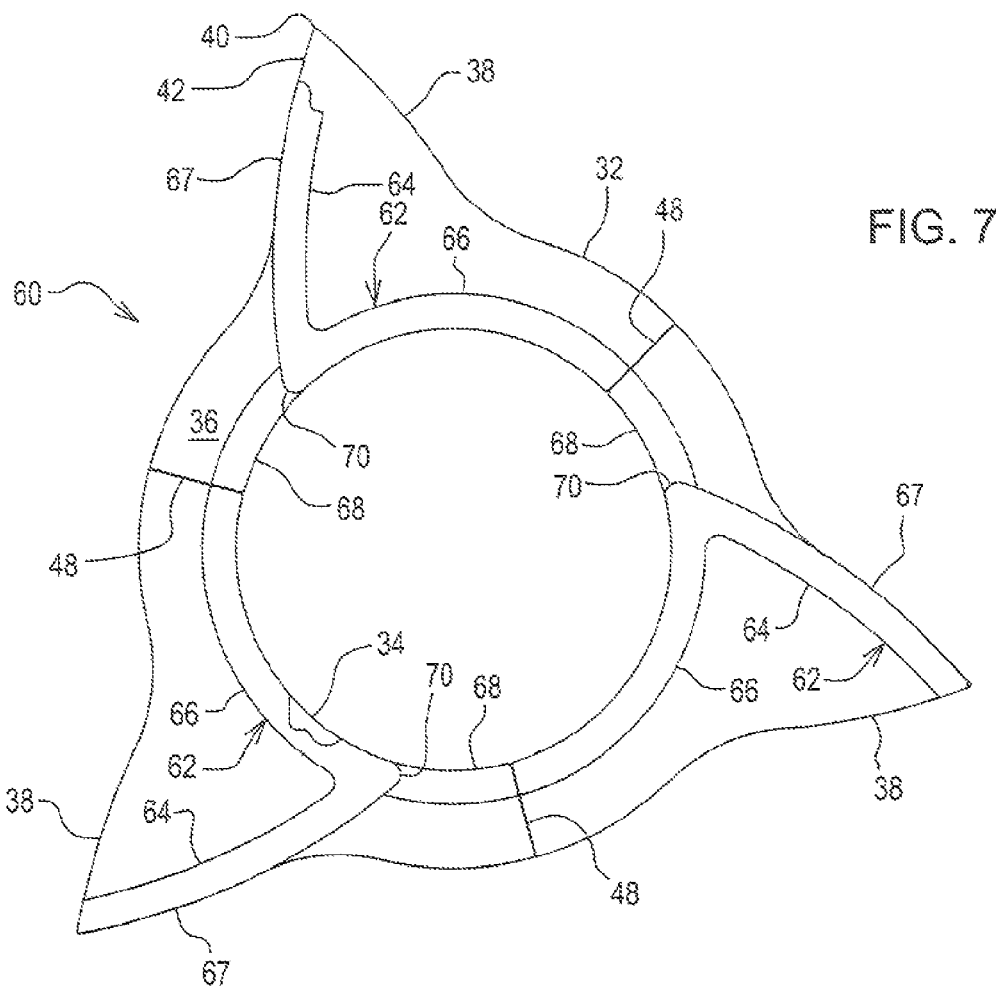
FIG. 7 is a side view like that of FIG. 4, but showing a second embodiment of the invention.

Referring now to FIG. 7, there is shown tine 60 constructed in accordance with a second embodiment of the invention which differs from the tine 30 in that pairs of reinforcing straps 62 are used in place of the pairs of straps 50. The pairs of straps 62 each include a first section 64 shaped and located like the pairs of straps 50, and include a second section 66 joined to, and extending in trailing relationship to, the first section 64, the second section 66 being curved about the axis of the hole 34 so as to reinforce a region of the mounting ring 32 bordering the hole 34. Each of the first sections 64 has a curved leading edge 67 which forms a lateral extension of the curved leading edge of the tine point 38. Like the tine 30, the plate 32 of the tine 60 is constructed in thirds, with ends of the second section 66 of each pair of reinforcing straps 62 terminating so as to be coincident with the welded ends 48 of the three sections of the mounting ring 36, thus leaving a gap between adjacent ones of the pairs of straps 62 in the reinforcement of the mounting ring 36 of the plate in the region bordering the hole 34. Filling each of these gaps is a second pair of straps 68 which are joined to, and form arcuate extensions of, the trailing pair of sections 66 of one of the pairs of straps 62, the trailing end of the second pair of straps 68 being shaped complementary to, receiving and being joined to, a rounded nose 70 defined at the juncture of the sections 64 and 66 of the strap 62. Thus, if n equals the number of tine points, then the angular distance spanned by the second section 66 of the pair of straps 62 is less than 360°/n and the angular distance spanned by the second pair of straps 68 is an angular distance when added to that spanned by the sections 66 equals 360°/n.

Referring now to FIG. 8, there is shown a tine 72, which is constructed in accordance with a third embodiment of the invention similar to the tine 30 shown in FIG. 4, but differing in that a sheet metal strap is formed to define an arcuately shaped ramp 74 that borders a region of the hole 34 in leading relationship to an inner end of that one of each of the pair of straps 50 which is on the side of the tine 72 that would face an adjacent one of the knives 22 when forming part of an installed rotor 60 (see FIG. 6). The ramp 74 is slopped axially outwardly form the mounting ring 36 of the plate 30 and has a leg 76 at its trailing end which abuts the leading edge 52 of the strap 50 at a height from the mounting ring 36 approximately equal to that of the strap 50. Thus, the ramps 74 each operate to engage crop and deflect it axially toward the adjacent knife 22 as the leading edge 52 of the strap 50 engages the crop and carries it for being cut by the knife 22.

FIG. 9 shows a third of a tine 80, which is a cast or forged version of the tine 72, with the straps 50 being formed as ribs 50' joined to opposite sides of points 38' and with the ramp 74 being formed by as a wedge-shaped ramp 74' projecting axially outwardly from a plate 32' and forming a leading extension of one of the ribs 50'. Since the ribs 50' are formed integrally with the plate 32', leading surfaces 52' of the ribs 50' and the leading surface of point 38' are joined together to form a single leading surface 82. While the operation of a rotor assembly including tines 80 is similar to that of the tines 72, it will be appreciated that there is an advantage in not having separate straps and ramps that need to be either welded or otherwise fastened to the tine plate using flush-mounted fasteners.

The operation of the various embodiments is thought evident from the foregoing description and will not be repeated for the sake of brevity. Suffice it to say, that each of the various tine constructions has the advantage of being relatively light weight while exhibiting stiffness preventing the tines from deflecting sideways during operation and coming into contact with the crop cutting knives and crop strippers that operate in conjunction with the crop processing rotor.

Having described the preferred embodiment, it will become apparent that various modifications can be made without departing from the scope of the invention as defined in the accompanying claims.

The invention claimed is:

1. A pre-cutter assembly for reducing crop material fed through the cutter, comprising: a transverse rotor including a cylindrical rotor body having a plurality of tines mounted thereto in side-by-side spaced relation to each other, with each tine comprising a plate provided with a centrally located circular hole and being mounted to said rotor body, with the body located in said hole such that the plates of the tines sweep respective, parallel circular paths extending perpendicular to a longitudinal rotation axis of the rotor body; each plate including a plurality of crop-engaging points disposed equal-angularly about, and projecting outwardly relative to said axis, with each point, as considered relative to a forward direction of rotation of said rotor, having leading and trailing edges converging outwardly to a tip of the point; and a plate stiffening arrangement comprising one of a pair of parallel stiffening straps being mounted in sandwiching relationship to, and of a pair of stiffening ribs being joined to, a leading region of opposite axially facing surfaces of each point, with each stiffening strap or rib, respectively, of said one of said pair of stiffening straps and pair of stiffening ribs having a leading edge conforming to the shape of and forming a sideways extension of the leading edge of the associated point and extending from the tip of the associated point to the circular hole in the plate.

2. The pre-cutter assembly, as defined in claim 1, wherein each stiffening strap or rib, respectively of said one of said pair of parallel stiffening straps and pair of parallel stiffening ribs has an axial thickness greater than the thickness of said plate.

3. The pre-cutter assembly, as defined in claim 1, wherein said stiffening arrangement comprises said pair of parallel stiffening straps associated with each point, and each strap including a trailing portion extending about an inner peripheral region of the plate bounding said hole through a first angular distance less than 360°/n, where n is the number of points.

4. The pre-cutter assembly, as defined in claim 3, and further including a second pair of parallel stiffening straps associated with each first-mentioned pair of parallel stiffening straps and fixed in sandwiching relationship to a further inner peripheral region of the plate, this second peripheral region beginning at a leading end of the first peripheral region and extending in the leading direction through an angular distance which, when added to the first peripheral region occupied by the first-mentioned pair of straps equals 360°/n, whereby an entire inner peripheral region of said plate is sandwiched by the first-mentioned and second pairs of parallel stiffening straps respectively associated with the plurality of points n.

5. The pre-cutter assembly, as defined in claim 1, and further including a ramp mounted to an inner peripheral region of one of said axially facing surfaces of each point, the ramp having a trailing end which abuts the leading edge of an adjacent one of said one of the pair of parallel stiffening straps and pair of parallel stiffening ribs, and having a leading end which commences at said one of said axially facing surfaces of the plate, with said ramp having an axially facing ramp surface that is inclined axially outwardly from said leading end to said trailing end, with the trailing end being spaced outwardly from said one of the axially facing surfaces of the plate by a distance approximately equal to an axial thickness of the adjacent one of said one of the pair of parallel stiffening straps and pair of parallel stiffening ribs.

6. The pre-cutter assembly, as defined in claim 1 wherein said tine is constructed as a casting and wherein said one of said parallel stiffening straps and pair of parallel stiffening ribs is said pair of parallel stiffening ribs with each rib being formed integrally with said plate.

7. The pre-cutter, as defined in claim 6, wherein each tine further includes a ramp formed integrally with, and forming a leading extension joined to, an inner end of each rib located at one axially facing side of said plate, with said ramp sloping axially outwardly from said plate from a leading to a trailing end.

8. A tine for a rotor adapted for being used with fixed counter-knives for reducing the length of crop stems or stalks, the tine comprising: a plate including a ring-shaped base having a substantially circular inner diameter, adapted for being received on a cylindrical rotor element, and having an outer diameter to which a plurality of crop-engaging points are respectively joined at equal-angularly spaced locations; each point, when considered in a forward direction of rotation of the tine, having a leading inner concave root section, an outer tip and a leading convex section extending between the tip and inner concave root section; and a plate-stiffening structure comprising one of a pair of parallel reinforcing straps mounted to opposite sides of each point and of a pair of parallel stiffening ribs formed integrally with opposite sides of each point, with each strap or rib, respectively of said one of said pair of parallel reinforcing straps and said pair of parallel stiffening ribs, having an edge section shaped like, and extending coextensive with, said leading convex section of an associated one of said points and extending from said tip to said inner diameter of said tine.

9. The tine, as defined in claim 8, wherein said one of said pair of reinforcing straps and said pair of stiffening ribs of the stiffening arrangement comprises said pair of parallel reinforcing straps associated with each point, with each pair of parallel reinforcing straps having a trailing portion engaged with opposite sides of, and having an inner edge formed at an inside radius equal to that of, the ring-shaped base of said plate.

10. The tine, as defined in claim 9, and further including a second pair of reinforcing straps curved similarly to said trailing portion and being in engagement with opposite sides of said ring-shaped base of said plate so as to form a leading extension of each said first-mentioned pair of parallel reinforcing straps.

11. The tine, as defined in claim 10, wherein said first-mentioned pair of parallel reinforcing straps each define a leading rounded corner at a location where the trailing portion is joined to a remaining portion of the first-mentioned pair of reinforcing straps; and said second pair of reinforcing straps each including a trailing end shaped complimentary to, and receiving a respective corner of said first-mentioned pair of reinforcing straps.

12. The tine, as defined in claim 8, and further including a ramp associated with each said one of said pair of parallel reinforcing straps and said pair of parallel stiffening ribs, each ramp being mounted to a respective radially inner region of one axially facing surface of said base ring of said plate and forming a leading extension of a radially inner region of an associated one of each pair of said one of said pair of parallel reinforcing straps and said pair of parallel stiffening ribs; said each ramp having a trailing end respectively abutting said leading edge of said associated one of said one of said pair of parallel reinforcing straps and said pair of parallel stiffening ribs and defining an axially facing ramp surface inclined axially outwardly from said axially facing surface of said base ring to an axially outwardly facing surface of said associated one of said one of said pair of reinforcing straps and ribs.

13. The tine, as defined in claim 12, wherein said one of said one of said pair of parallel reinforcing straps and said pair of parallel stiffening ribs of said stiffening arrangement comprises said pair of parallel straps being associated with each point; and each said ramp being constructed of a metal strap having a thickness approximately one third of that of an associated one of said pair of reinforcing straps, with said trailing end of said ramp being defined by a bent end portion of said metal strap.

14. The tine, as defined in claim 8, wherein each pair of said one of said pair of parallel reinforcing straps and said pair of parallel stiffening ribs is said pair of stiffening ribs, with each stiffening rib having a radial outer end shaped to conform, in side view, to a radially outer end section of an associated one of said plurality of points.

15. The tine, as defined in claim 8, wherein the tine is formed as one of a forging and a casting with said one of said pair of parallel reinforcing straps and said pair of parallel stiffening rib of each stiffening arrangement being said pair of parallel stiffening ribs being one of forged or cast integrally with said plate.

16. The tine, as defined in claim 15, wherein each tine further includes a ramp formed integrally with, and forming a leading extension joined to an inner end of, each rib located at one axially facing side of said plate.

\* \* \* \* \*